United States Patent [19]

Aragaki et al.

[11] Patent Number: 4,464,582

[45] Date of Patent: Aug. 7, 1984

[54] WATER-SAFE HAIR DRYER CIRCUIT

[76] Inventors: Tsunehide Aragaki, c/o 122 E. 42nd St., New York, N.Y. 10017; Yukio Noguchi, 3F, 22-5, Ching-Chung St., Taichung, Taiwan

[21] Appl. No.: 433,652

[22] Filed: Oct. 12, 1982

[51] Int. Cl.³ .............................................. H02H 3/16
[52] U.S. Cl. .................... 307/118; 307/140; 307/326; 361/42; 328/4; 219/363; 340/604; 34/96
[58] Field of Search .................. 307/118, 132 M, 140, 307/326, 327, 328; 361/42; 328/4; 34/96-98; 132/9; 172/11; 219/363, 364, 369, 370, 373; 340/604

[56] References Cited

U.S. PATENT DOCUMENTS

3,500,059  3/1970  Fielding et al. ..................... 307/118
3,525,902  8/1970  Davidson et al. .................. 307/118
4,227,190  10/1980 Kelley et al. ........................ 340/604
4,270,158  5/1981  Gilardoni et al. ..................... 361/42

Primary Examiner—E. A. Goldberg
Assistant Examiner—Derek S. Jennings
Attorney, Agent, or Firm—Armstrong, Nikaido, Marmelstein & Kubovcik

[57] ABSTRACT

An automatic power shut-off circuit for a wide variety of electrical appliances, such as hand-held hair dryers, razors, irons, hair curlers, etc. which pose a risk of electrocution when used around water. Thus, said circuit avoids the risk of dangerous shocks or even death, if the appliance should fall into a tub of water in which someone is bathing or if someone reaches or steps into water containing a plugged-in appliance, regardless of whether the switch of the appliance is on or off.

3 Claims, 9 Drawing Figures

WATER-SAFE HAIR DRYER CIRCUIT

BACKGROUND OF THE INVENTION

1. Field of the Invention

In the field of electrical appliances that are used around water, there is an inherent problem of submitting the user to the risk of electrocution or serious shock or even death. Thus, there is a need to avoid the risk of dangerous shocks or even death if the appliance falls into a tub of water in which someone is bathing or if someone reaches or steps into water containing a plugged-in appliance regardless of whether the switch thereof is on or off. In particular, for example, in view of the fact that the great majority of hair dryers today stay in the bathroom, these appliances pose a serious risk hazard.

2. Description of the Prior Art

There is a device called a "ground-fault circuit interruptor (GFCI)" which, by law in some states, must be installed in bathrooms of all new homes. But this protects the user from electrocution only when the electric appliance he is using is leaking electricity or is short-circuited. It does not protect the user without fail in such conditions as described above.

SUMMARY OF THE INVENTION

This invention overcomes the problems known heretofore by providing an automatic power shut-off circuit and an electrical apparatus in combination with an automatic power shut-off circuit. The power shut-off circuit has a water sensing means having spaced apart conductors adapted to be bridged by water for causing the automatic power shut-off circuit to operate. In one embodiment, the water sensing means comprises equally spaced conductors forming a labyrinth adjacent the air inlet and outlet of an electric hair dryer.

In one embodiment, the power shut-off circuit has first and second normally closed switches connected in a circuit to a power source means having a first leg and a second leg formed with a condenser for producing a voltage connection across the space between the conductors when water bridges that space; and means responsive to the voltage connection across the space between the conductors of the water sensing means for opening the normally closed switches for shutting off the circuit to the power source means.

Advantageously, this invention provides the combination of an automatic power shut-off means and an electrical appliance having protection against the risk of electrocution when energizing the appliance from a power source means around water. To this end there is provided an electrical appliance means having power source means forming first and second legs; water sensing means having a first conductor connected to one of said legs and a second conductor forming a space that is adapted to be bridged by the presence of water for connecting the second conductor to the first leg; and power shut-off circuit means responsive to the connection of the second conductor to the first leg for automatically shutting off the power source means from the electrical appliance means in accordance with the splashing of water or the immersion of the appliance in water so as to produce the connection between the first leg and the second conductor.

Advantageously the water sensing means for the power shut-off circuit comprises the improvement of a water-sensing strip means having a non-conductive support means, conductors spaced from each other on the non-conductive support means for automatically shutting off the electrical appliance from the power source means when the conductors are connected by the presence of water. To this end, the water sensing means includes a heat-resistant, flexible support of thin non-conductive means having flexible conductors affixed to the surface thereof and the flexible conductors form narrow strips which are laminated to the surface of the non-conductive means to form a labyrinth-like configuration terminating in a plurality of dead ends. For example, the conductors may be metallic foils having fixed spacing therebetween for providing a current flow in the foils when the water bridges the space therebetween. Also the water sensing means can be curved around the inlet and/or outlet air ducts of a hair dryer.

It is also desirable to provide a power shut-off for a variety of electrical appliances such as electric shavers, power tools, aquarium pumps, etc.

OBJECTS OF THE INVENTION

It is, therefore, an object of this invention to provide the combination of an electrical appliance having a power source means, a water sensing means and a power shut-off circuit for overcoming the risk of electrocution when the appliance is splashed or immersed in water.

It is also an object of this invention to provide an automatic power shut-off circuit for automatically shutting off an electrical appliance when the same is immersed in water.

It is also an object of this invention to provide a novel water sensing means for a wide variety of electrical appliances that may be immersed in water.

Another object of this invention is to provide a small, compact, power shut-off circuit with inexpensive, off-the-shelf elements.

It is a still further object of this invention to provide an automatic power shut-off means and a water sensing means for a hair dryer.

The above and other objects will appear more fully from the following detailed description of five embodiments when read in conjunction with the accompanying drawings. However, it is expressly understood that the drawings are for the purposes of illustration only.

DETAILED DESCRIPTION OF A PREFERRED EMBODIMENT

The automatic power shut-off circuit of this invention is useful in a wide variety of electrical appliances that may be used around water. For example, this invention is useful with hair dryers, razors, irons, hair curlers, electric shavers, power tools, aquarium pumps and even extension cords. However, the use of this invention is not limited to these appliances as will be understood in more detail hereinafter. Thus, while this invention and its preferred embodiment is described in connection with a variety of hair dryers, the use of the power shut-off circuit of this invention is not limited thereto.

Figure 1A:
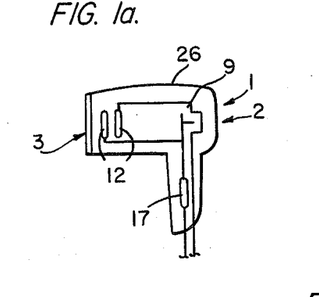
FIG. 1a is a partial side view of a hair-dryer having one embodiment of the water sensing means of this invention adjacent a back and front inlet and outlet.
Figure 1B:
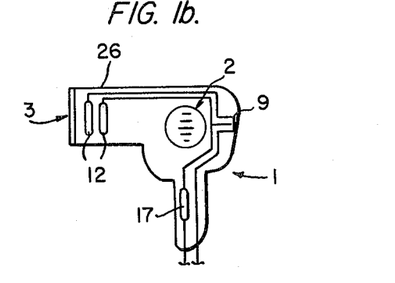
FIG. 1b is a partial side, cut-away view of another hair-dryer having an embodiment of the water sensing means of this invention adjacent a side and front inlet and outlet.
Figure 1C:
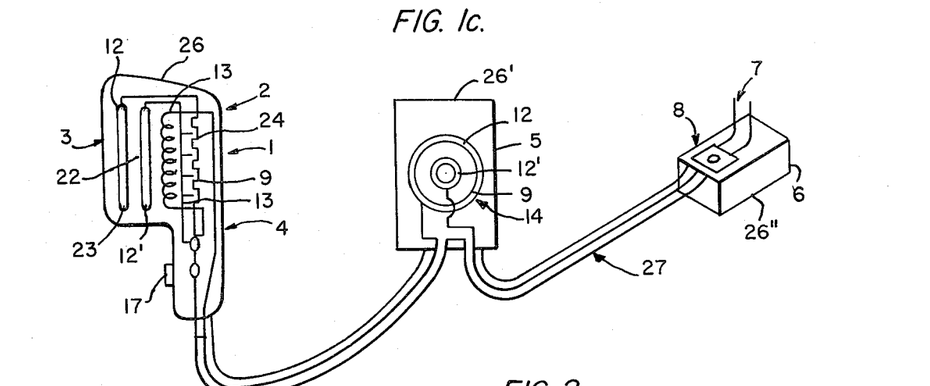
FIG. 1c is a partial side cut-away view of still another hair-dryer having an embodiment of the water sensing means of this invention adjacent an air inlet and an air outlet and having the automatic power cut-off circuit of this invention in a breaker plug.

As shown in FIGS. 1a, 1b and 1c, there are a variety of types of dryers 1 with which the power shut-off and water sensing means of this invention may be used. FIG. 1a shows a hand-held hair-dryer having a back and front inlet 2 and outlet 3. FIG. 1b shows another kind of a hair dryer having a side inlet and a front outlet. On the other hand, FIG. 1c shows another type of hair dryer having an inlet in the handle 4 and an outlet opposite thereto. Also the dryer of FIG. 1c may have a holder 5 and a breaker 6 for a plug 7. As will be understood in more detail hereinafter, this invention is useful in all three of these types of hair dryers. However, it will be understood from the following that this invention comprises a power shut-off circuit 8 and a water sensing means 9 which can be used with these and/or a variety of other hand-held hair dryers and/or other electric appliances, and may be used with a variety of conventional power sources having legs 10 and 10' of opposite polarity. Still further, the water sensing means has a support 11 and spaced apart conductors 12 and 12'.

Referring now to FIG. 1c, the dryer 1 has an electrical heating circuit 13 and a power shut-off circuit 8 as well as a water sensing circuit 9. In this embodiment, the heating circuit 13 and the water sensing circuit 9 are present in the hand-held hair dryer 1 adjacent the inlet and outlets thereof and the heating element 13' and/or elements are in between the inlet and outlet which, for ease of explanation, are designated as inlet 2 and outlet 3 in the handle 4. As will be understood in the art, the hand-held dryer 1 has a thermostat 15 and a thermal fuse 16 as is conventional in the art. Also, the dryer 1 has a heat regulating switch 17, which may be a one or two position switch and may include a power shut-off switch. The dryer 1 may also optionally have a holder 5 which is referred to hereinafter, for ease of explanation, as an optional holder 5 that may or may not contain the water sensing means 9 and/or the shut-off circuit 8 of this invention.

Figures 2, 3:
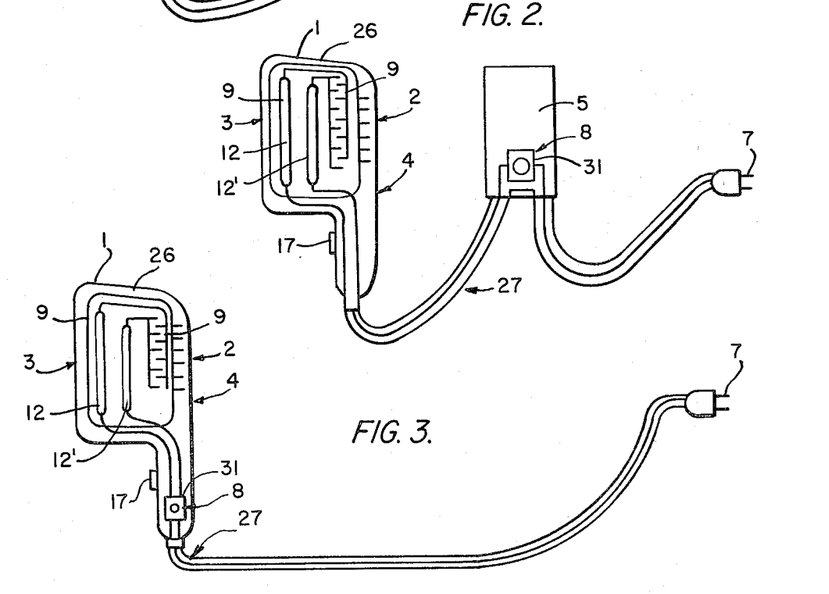
FIG. 2 is a partial cut-away view of the dryer of FIG. 1 having a dryer holder with a power shut-off circuit therein.
FIG. 3 is a partial side view of the dryer of FIG. 2 without the dryer holder thereof and with the power shut-off circuit in the dryer handle.

In this connection, the dryer of FIG. 1c and FIG. 2 both have a dryer holder, whereas the dryer 1 of FIG. 3 does not have a dryer holder since the dryer holder is optional. Likewise, the system of FIG. 1c has a breaker which is designated, for ease of explanation, as a separate breaker 6 such as is well known in the art, whereas the dryers of FIGS. 2 and 3 are without such a breaker.

Still further, the dryer of FIG. 1c has a power shut-off circuit 8 in the breaker 6, whereas the dryer 1 of FIG. 2 has the power shut-off circuit of this invention in the holder 5. On the other hand, the dryer 1 of FIG. 3 has the power shut-off circuit 8 of this invention in the handle 4 of the dryer. All three dryers of FIGS. 1c, 2 and 3 have power plugs 7, such as illustrated in the drawings. These are designated, for ease of explanation, as power plugs 7 for a conventional power source having two legs 10 and 10'.

The water sensing strips of the embodiment of FIG. 1c are advantageously installed inside and along both air intake and outlet grills of the dryer housing 26 containing the heater circuit 13 and also inside the wall-mounting dryer holder 5 in such a way that if the strip comes into contact with water, it immediately causes the dryer to be shut off. On the other hand, however, it is understood that the water sensing strip 12 may alternately be installed inside and along both air intake and outlet grills of the dryer housing 26, which contains heater circuit 13, and not in the wall mounting dryer holder or mounted dryer holder 5 if the latter is rigidly mounted.

It will also be understood that the power shut-off circuit 8 can be located in at least three possible places. One place is inside the breaker 6, which also houses the power plug 7 and is connected to the power cord 27 coming out of the hair dryer 1 by way of the dryer holder 5. This embodiment is shown in FIG. 1c. On the other hand, in the embodiment of FIG. 2, the power shut-off circuit may be located inside the dryer holder 5 which is connected to the hair dryer 1 with a portion of the power cord 27. In this case the power shut-off circuit 8 is in a small compartment completely sealed from the outside with silicon glue. In still another alternative location, the power shut-off circuit 8 may be located inside the hair dryer 1 itself, as shown in FIG. 3. In this case, the power shut-off circuit 8 may be located in the handle area of the dryer 1 in a completely sealed chamber.

Ordinarily, the conductors 12 and 12' of the water sensing circuit 9 are comprised of narrow conductor strips supported on the surface of the support 11, which is non-conductive. To this end, for example, the conductors 12 and 12' are thin and narrow metallic foils laminated to the support 11 with a substantially uniformly fixed spacing between the foils. Thus, when water bridges any portion of the substantially uniformly fixed spacing between the foils, the water transmits a voltage from the one leg 10' of the power source means to the second conductor 12' of the water sensing circuit 9 to actuate the power shut-off circuit 8 which responds to the voltage connection between conductors 12 and 12' as well as leg 10' and conductor 12' to automatically shut off the dryer 1 when the same is energized from the two legs 10 and 10' of the power source means.

As shown most clearly in FIGS. 1a–1c and 4b–5, the foils have longitudinally extending portions that face each other across the substantially uniformly fixed space between the foils along at least one longitudinally extending axis. In FIG. 1a, only one longitudinally extending axis is shown for the respective inlet and outlet water sensing strips, which consist of foils 12 and 12'. However, there are many such equivalent longitudinally axes shown in FIGS. 1c, 2, 3, 4b and 5. Likewise, the latter Figures illustrate a labyrinth configuration having many dead-ends, thus providing a narrow space between conductors 12 and 12' having a large geographical area for increasing the statistical chance that even a shower or other splattered water, which often precedes full immersion, would cause the shut-off circuit 8 of this invention to operate in a fail-safe manner to prevent the user from being electrocuted.

Figures 4A, 4B:
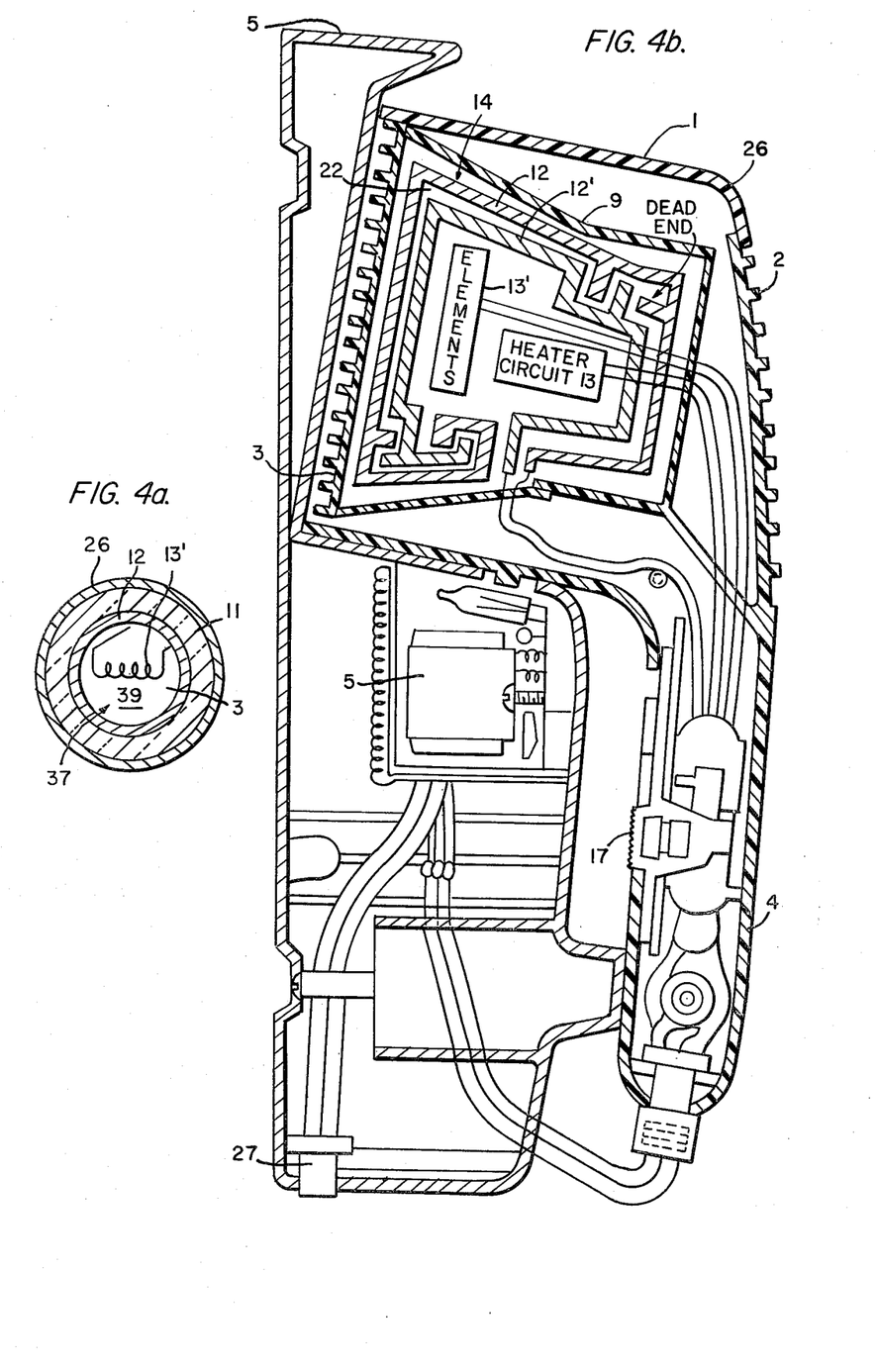
FIG. 4a is a partial cross-section of the outlets of the dryers of FIGS. 1a and 1b showing one conductor of the water sensing means thereof.
FIG. 4b is a more detailed cross-section of the dryer of FIG. 2c.

Since the respective narrow strips formed by conductors 12 and 12' are ordinarily adjacent to the inlet and outlet air ducts of the dryers shown in the drawings, all of which are ordinarily circular in cross-section, the conductors are thin metal foils that may be bent in a circle with their support 11 as illustrated in FIG. 4a. To this end, the support 11 is advantageously a flexible non-conductor which is attached to the inside of the air duct and the foils are laminated to the surface of the support 11. The inside of the air duct may be a metal reflector in the case of the outlet of FIG. 4a. However, the inside may also be high impact, temperature resistant plastic in the case of the inlet air duct, or any other suitable material that is found in conventional hand-held hair dryers and/or their holders and/or any other electrical appliance with which this invention is used.

Figure 5:
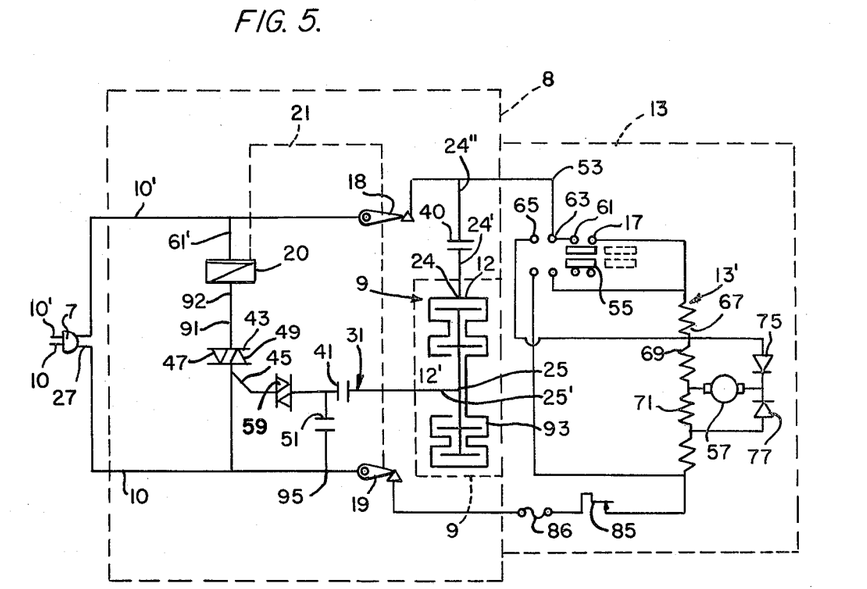
FIGS. 5-6 are partial schematic drawings of two embodiments of the power shut-off circuit of this invention.

In the case of the holder 5, it may be particularly advantageous to face the narrow foils and/or the water sensing circuits and/or strips formed thereby in a plane, such as illustrated in FIG. 5. However, it is also advantageous to fabricate the foils and the water sensing circuits and/or strips formed thereby in a plane and then to bend the same into a curved shape, such as the circular cross-section shown in FIG. 4a, or into a rectangular cross-section or any other suitable cross-section that is found in the inlets and/or the outlets of conventional dryers. To this end, suitable foils may be made of aluminum, copper or any other metal conductor, such as conventional aluminum or copper alloys or stainless steel plated copper. The support may likewise be made of initially flexible non-conductors, such as high temperature polymide flurocarbon silica and/or silica compositions, or any other non-conductors that may harden, such as polyethylene, polystyrene, epoxy resins, bakelite, etc. Also, suitable attachment glues may be used according to well known fabrication steps, methods and procedures.

This is advantageous since the respective strips made from the respective conductors 12 and 12' are ordinarily fabricated by conventional means such as molds, dyes and/or photoetching means to provide parallel conductors forming a substantially uniform and fixed space therebetween across which the water "bridges" for producing a voltage connection between the conductors. This space is ordinarily as narrow as possible, consistent with the manufacturing and electrical constraints provided by this invention which will be well understood by one skilled in the art based upon the disclosure and claims provided herein. Ordinarily, for example, the space between the conductors 12 and 12' is only up to from about a millimeter to several millimeters. In this connection, the smaller the space, the smaller the resistance of the water that bridges the space between the conductors. On the other hand, this space must not be so small as to produce arcing, leakage or other faults that will trigger the power shut-off circuit 8 unnecessarily. Likewise, the space between the conductors 12 and 12' should not be so large as to present a resistance in the presence of water in the space that would prevent the water from either bridging the gap or preventing the required breakdown voltage for the power shut-off circuit 8 from occurring, as will be understood in more detail hereinafter.

In this connection also, it is noted that the labyrinth formed by the strip of FIGS. 1a-3 and 4b-5 may have a variety of shapes, both curved and straight, in a plane, around one or more axes, depending, for example, on whether the water sensing circuit 9 is in a dryer, a holder or some other location. In the dryers of FIGS. 2c-3, for example, the strips are bent around the inside of their respective inlet and/or outlet air ducts. On the other hand, conductors 12 and 12' may take the shape of concentric conductors in a plane around an equilibrium axis as illustrated in the holder 5 of FIG. 1c. However, the respective shapes of the other water sensing means of the other Figures may be used in the holder of FIG. 1c or vice-versa.

Thus, also the element making up the outer conductor 12 and/or the inner conductor 12' may serve other functions, such as support means, encapsulation means, reflective means, high temperature means, or in combination with the circuit means shown or other circuit means, etc. For example, the encapsulated power shut-off circuit 8 of FIG. 2 may be used alone, in combination or in connection with the water-sensing means 9 of FIG. 1c by combining the same in the holder of FIG. 1c or FIG. 2 or the handle of FIG. 3. In this connection, since it is advantageous to encapsulate a small power shut-off circuit 8 in a water-proof cocoon made, for example, of silicon glue, this cocoon may be attached to the back of the support 11 or form the same since the glue may be curved or bent with the conductors 12 and 12' into almost any desired curve or shape. Likewise, such an arrangement may provide the desired labryinth in a variety of shapes having an almost unlimited number of dead-ends as may be desirable, and may be combined with any number of other elements, even including a GFCI element as a support, or that provides at least one active conductor for the water sensing strip.

Referring now to FIG. 5, there is shown a partial schematic drawing of one embodiment of the power shut-off circuit 8 of this invention which comprises a novel arrangement of inexpensive off-the shelf items. As will be readily seen, there are two power shut-off switches 18 and 19 which are illustrated with conventional armatures and contacts. These switches 18 and 19 are controlled by solenoid means or as part of a conventional relay 20 having conventional connection means. This is illustrated by the "dashed line" 21 which controls the opening and closing of the armatures and contacts of the respective switches 18 and 19. Thus, when the normally closed switches 18 and 19 are to be cut off by solenoid 20, the solenoid 20 is energized to lift the armatures from the contacts of switches 18 and 19, thus to open the switches.

The water sensing strip is located in a water sensing circuit 9 connected to the power plug 7 through switch 18. To this end, the top terminal 24 of the water sensing strip is connected to the power shut-off switch 18 by leads 24' and 24''. On the other hand, the terminal 25 of the water sensing circuit 9 is connected to lead 25' for energizing the solenoid 20 to open the normally closed contacts 18 and 19.

As will be understood from the above, the elements of the power shut-off circuit 8, which comprises conventional circuit elements, may be located in the housing 26 of the handheld dryer 1 or the housing 26' of the dryer holder 5 or the housing 26'' of the breaker 6. To this end, the AC power supply cord 27 is suitably arranged as shown in FIGS. 1c, 2 and 3, for example. Advantageously also the water sensing circuit 9 is located in the dryer and/or in the holder with suitable silicon glue. For ease of explanation, however, the circuit of FIG. 5 shows the water sensing circuit 9, and the heater circuit 13, all in the handle and/or housing 26 of the dryer 1. In this connection, it is suitable to manufacture the power cut-off circuit 8 of this invention in such a way as to provide a small, compact or circuit 31, which can be located in the various components.

In understanding how the circuit shuts off the dryer, as shown in FIG. 5, this circuit 31 has a condensor 40 connected between switch 18 and terminal 24 and a consensor 41 connected to lead 25' and triac 43. This triac has a gate 45 and oppositely directed elements 47 and 49. Also a condensor 51 is located between gate 45 and the first leg 10 of the power plug 7. The other leg 10' is connected to the switch 18 and through a lead 61 to one side of the relay 20. The other side of the relay 20 is connected to the element 47 of the triac 43.

Referring now to the heater circuit 13 of the dryer of FIG. 5, the heat regulating switch 17 is connected to the power shut-off switch 18 and through a condensor 40 to the terminal 24 of the water sensing strip 9 by a leads 53 and 24 and terminal 24'. This heat regulating switch is a three-position switch 17. Thus when slide 55 is in the off position, the heater motor 57 and heating elements 13' are not energized. On the other hand, when the slide is moved to contact 61, 63 and/or 65, the heater and motor are energized in low or high modes, respectively. To this end, for example, the 67, 69, 71 and 73 heating elements are energized through power shut-off switch 18 and heat regulating switch 17 as desired.

The diodes 75 and 77 are connected to the heat regulating switch 17 and the center point of the respective heating elements 67 and 69 or 71 and 73. Also the thermostat 85 and the thermal fuse 86 are connected from the heating elements to the power shut-off switch 19.

Advantageously the power shut-off circuit 8 of FIG. 5 is connected as follows: The solenoid 20 is connected in series with the terminal 91 of the triac 43, which is advantageously a bi-directional thyristor. Also these elements are connected in parallel with the opposite legs 10' and 10 of the power plug 7, while the solenoid 20 has one of its sides connected to the heat regulating switch 17 of the heater circuit 13 by way of the power cut-off switch 18. As will be understood from FIG. 5, the other side 92 of the solenoid 20 is selectively connected to the thermal fuse 86 of the heater circuit 13 through the triac 43 and the power shut-off switch 19.

Also the water sensing circuit 9 of the embodiment of FIG. 5 consists of a water sensing strip 93 whose one end goes through condensor 40 is connected to a point between the power shut-off switch 18 and the heat regulating switch 17. The other end goes through condensor 41 and condensor 51 to the connecting point of terminal 95 from triac 43 and the power shut-off switch 19. Meanwhile, condensor 51 and condensor 41 have connecting points and leads that go through trigger diode 59 to the gate 45 of triac 43.

Figure 6:
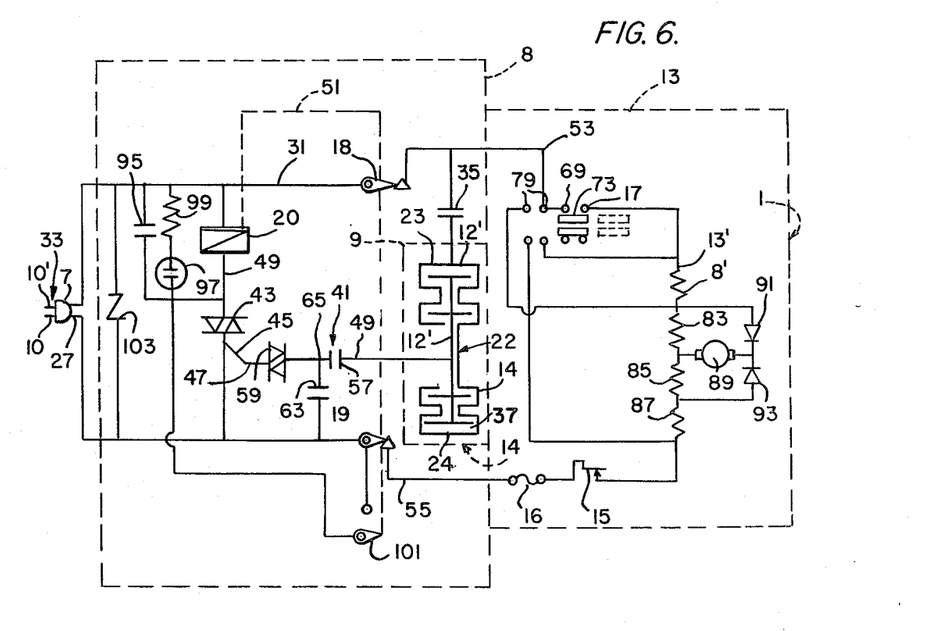

Referring now to FIG. 6, the main elements will be identified and then the water sensing circuit 9 and the power shut-off circuit 8 and the heater circuit 13 will be discussed. Since the heater circuit comprises conventional heating elements 13', thermostat 15, fuse 16 and heat regulating switch 17, as well as a motor and diodes, they will be discussed last in connection with the operation of the two other circuits.

The water sensing circuit 9 is made in strips 14 which simply comprises the first conductor 12 and the second conductor 12', which are spaced from each other across a space 22 on the non-conducting support 11, which is shown in FIG. 4a, for example, As shown in FIG. 6, the strip 14 may be made in one piece having a first section 23, which may be adjacent the inlet 2 of the dryer 1 and a second section 24, which may be adjacent the outlet 3, such as shown in FIG. 1c for example. To this end, the strip 14 is bent to curve it into the desired shape, such as the cylindrical shape of FIG. 4a for the outlets 3 of the embodiments of FIGS. 1a–1b or the elongated circular or rectangular shapes for the dryers of FIGS. 1c, 2, 3 and 4b. It will be understood, however, that the inlet and outlets may have their own separate strips 14, just as the holder 5 of FIG. 1c has its own strip 14. To this end, the strips are supported by the housing 26 of the dryer of FIGS. 1a, 1b, 1c, 2, 3, 4a and 4b, or the housing 26' of the holder 5 of FIG. 1c. In like manner, the cord 27 may connect the plug 7 directly to the dryer 1 of FIG. 3, indirectly through the holder 5 of FIGS. 1c and 2, and the power shut-off circuits 8 are suitably connected in the breaker 6 of FIG. 1c, the holder of FIG. 2 or the dryer 1 of FIG. 3.

The main elements of the power shut-off circuit 8 of FIG. 6 comprise the first and second normally closed switches 18 and 19, which are connected in a circuit 31 to the power source plug 7 for energizing the heater circuit 13 and the water sensing circuit 9. Thus, when plug 7 is inserted into a conventional wall outlet, the plug 7 becomes a source of power, which is referred to herein as the "power source means 33". It will be understood, therefore, that the power source means 33 has a first leg 10 and a second leg 10' that are connected to the switches 18 and 19 of relay 20 (or the switches of a conventional solenoid as the case may be) in a conventional manner.

For ease of explanation, the first leg 10 of circuit 31 is connected to switch 19 and the second leg 10', which is connected to switch 18, is formed with a condensor 35. This condensor supplies a voltage connection from leg 10' across the space 22 between the conductors 12 and 12' when water bridges that space.

The circuit 31 may likewise be understood as making a voltage connection 37 between the second leg and the second conductor 12' across the space 22 when water 39 bridges the space 22 between the conductors 12 and 12', as will be understood from the cross-section of FIG. 4a wherein the dryer 1 is immersed in the water to fill the outlet 3 with water to bridge the space from conductor 12 to conductor 12' (not shown in FIG. 4a). Thus, it will be understood that the strip 14 of FIG. 6 is adapted to have this voltage connection made across its space 22 between its conductors 12 and 12' under the appropriate circumstances in the presence of water.

When this voltage connection is made, there is a means 41 responsive thereto for opening the normally closed switches 18 and 19 for automatically shutting off the circuit 31 to the heater circuit 13, as will be understood in more detail hereinafter.

In order to make the required voltage connection to the power shut-off circuit 8 across the space 22 of the water sensing circuit 9, the means 41 responsive thereto comprises a normally open switch 43, which is connected by a gate 45 to the second conductor 12' of the water sensing circuit 9 to be responsive in a first path 47 to the voltage connection across the space 22. Thus, when the gate 45 is triggered by this voltage connection, the switch 43 is closed to provide a connection in a second path 49 across the relay 20 from leg 10 to leg 10' of the power source means 33.

This, it will be understood, energizes the relay 20 to open switches 18 and 19 via connection 51 to immediately shut off circuit 31 from the heater circuit 13. However, it is understood that any appliance is adapted to be connected in the circuit 31 formed by the normally closed switches 18 and 19 to run on a current from power source means 33 by substituting the appliance for heater circuit 13. When, on the other hand, this circuit is interrupted by the opening of switches 18 and 19, the appliance is automatically and immediately shut off, even when there is made a momentary voltage connection across the space between the conductors 12 and 12' of the water sensing strip 14 by the presence of water therein for the protection of the user against the risk of electrocution when the appliance is immersed in water. To this end, the opposite power source legs 10 and 10' are connected to the input and output leads of the appliance instead of the input and output leads 53 and 55 of the heater circuit 13, which are described in more detail hereinafter in connection with the operation of the heater circuit 13.

In the preferred embodiment for the means 41 responsive to the voltage connection across space 22 from the conductor 12 to conductor 12' and/or from leg 10' to conductor 12', it will be understood that several different circuits and circuit elements may be used. In the embodiment of FIG. 6, conductor 12' is connected to gate 45 by a series connection with a second condensor 57 having suitable circuit elements 59 and 63. For example, the circuit element 63 may be a third condensor and the element 59 may be a trigger diode and the like. Thus, these elements respond to the voltage connection to transmit a voltage to the normally open (non-conducting in the first path 47) switch 43 that exceeds the breakover voltage thereof in response to bridging of the space between the opposing spaced-apart conductors 12 and 12' of the water sensing strip 14 in accordance with the charging (and discharging) of the condensors from the power source means 33, even when there is only even a momentary voltage connection across the space 22.

There are several different possible elements that may be used in the second path 49' to the gate 45 of the switch 43. Advantageously, however, in one sequence, the normally open switch 43 for actuating the relay 20 is a conventional triac, such as a thyristor. Also, the elements 59 and 61 comprise conventional trigger diodes and element 63 is a third condensor. Thus, when the voltage connection occurs from the second leg 10' containing the first condensor 35 to connect the same across the space 22 to the second conductor 12' as described above, the connecting point 65 between condensor 57 and 63 connects these elements in the first path 47 first to charge the condensors by causing a current flow therewith. Then the condensors discharge to provide a discharge from condensor 63 for triggering the trigger diode 59. This is ordinarily referred to as the result of a voltage that exceeds the breakover voltage of the trigger diode 59. This, in turn, triggers the gate 45 of triac switch 43 by way of a discharge. To this end, this discharge produces a voltage at the gate above the breakover voltage of the triac switch 43 so that the triac switch 43 closes to energize the relay 20. This, in turn, opens switches 18 and 19 to completely disable the appliance connected to the input and output leads 53 and 55. As a result of this disabling of the appliance of FIG. 6, which is a schematic illustration of the dryers of FIGS. 1a–4b, for example, the dryer heating circuit 13 is completely shut-off from the power source 33 no matter what the position of the heat control switch 17 thereof. In this connection, it will be understood that the heat control switch conventionally has on-off contacts 69, a slide 71 and various heat control contacts 73, 75, 77 and 79, various corresponding heating elements 81, 83, 85 and 87 having respective connecting points therebetween for energizing the heating elements in conjunction with the fan motor 89, which blows air across the heating elements from the inlet to the outlet of the dryer. It will also be understood that the motor may be a conventional AC motor that is run in series with the respective heating elements by means of suitable connections with diodes 91 and 93, as is conventional. Also, another condensor 95 could optionally be used to prevent chatter of the switches 18 and 19 when opened. This provides a very accurate and positive reaction to water by the water sensing strip 14. Moreover, a suitable indicator 97, such as a neon light connected between legs 10 and 10' by a resistor 99 and a normally open switch 101 could be used to indicate when the heater is inoperable because switches 18 and 19 are open and/or water is "bridging" the space 22 between the conductors of the water sensing circuit 9. Still further, a varistor 103, such as a ZNR varistor, may be connected in parallel with plug 7 to prevent triac 43 from malfunctioning and/or from being damaged as a result of current surges, such as those produced by near-by lightning strokes.

In the circuit of FIG. 6, the neon lamp or indicator 97 is linked to the power shut-off circuit 8. To this end, normally open switch 101 is closed by connection 51 when solenoid 20 is actuated to close switches 18 and 19. Thus, when the power shut-off circuit 8 is activated, this neon lamp 97 lights up, thereby warning the user that the same, i.e., the power shut-off circuit 8, has been triggered.

In the operation of one sequence of all the respective circuit elements and circuits of FIG. 6, the power plug 7 is plugged into a suitable wall outlet. This connection forms a suitable power source 33 having respective legs 10 and 10' that are connected to the heat regulating switch 17 through the power shut-off switches 18 and 19. Thus, when the heat regulating switch 17 has its slide 71 in the "on" position by connecting suitable contacts, such as contacts 73 and 75 and 77, the heater elements, such as heating elements 81, 83, 85 and/or 87 are energized along with the motor 89. Also the heater can be switched off manually be merely moving the slide 71 to the off position as is conventional.

Typically, the heat regulating switch 17 is connected to the heating elements and into thermostat 15 and then to the thermal fuse 16 all in series. While the heater elements 81 and 83 have a connecting point and the heating elements 85 to 87 have a connecting point which are led to one terminal of the DC motor 89 by way of the rectifier diodes 91 and 93, respectively. Also the connecting point of heating elements 83 and 85 is led to the other side of the DC motor 89 and the connecting point of the heating elements 81 and 83 and the heating element 87, as well as thermostat 15 have connecting points which are hooked back to the heat regulating switch 17. Thus, when the contacts 18 and 19 are in their normally closed position, which is when there is no water in the space 22 between the conductors of the water sensing means, the dryer and its heating circuit 13 are operable as desired in a conventional manner.

The hair dryer 1 thus constructed works and functions just as any conventional and ordinary hair dryer works when it is drying hair. Thus turning on the heat regulating switch 17 lets electricity flow into heater circuit 13, activating heater elements 81 through 87 and DC motor 89. However, once housing 26 containing both heater circuit 13 and water sensing circuit 9 falls into water or "feels" a sudden splash of water, the following sequence of events takes place, resulting in an automatic and instantaneous interruption of the power shut-off circuit 8, thereby protecting the user.

In this sequence, which is operable regardless of the setting position of the heat regulating switch 17, metallic foils 22 on water sensing strip 14 are "bridges" by water. This sends an electric voltage to the gate of triac 43, thereby turning triac 43 on in the embodiment of FIG. 6, which can be used in any of the dryer systems shown in FIGS. 1c, 2 and/or 3. The turning on of the triac 43 triggers the relay 20. Thereupon, power shut-off switches 18 and 19, which are linked with relay 20, are turned off or put into their open position. This prevents the electric current from flowing into the heater circuit 13.

For purposes of safety, no reset switch is shown. Thus when the solenoid 20 is triggered by the triac 43 to open the power shut-off switches 18 and 19, the dryer is made inoperative. Thus, no current can flow into and/or through the dryer and/or the holder of the apparatus of FIG. 1c after the power shut-off switches 18 and 19 are open. Ordinarily, therefore, the solenoid and switches 18 and 19 would remain in their open position until the water is removed from strip 14, when the solenoid and power shut-off switches 18 and 19 could be reset automatically by a suitable spring loaded relay 20 when no water was "bridging" the space 22 between the conductors 12 and 12' of the water sensing strips 14. However, the plug 7 of the appliance, such as a dryer, has to be unplugged and replugged into a wall plug to reactivate the switches 18 and 19 into their normally closed position even if the water on the sensing strip is completely wiped off. Thus, the dryer is, and would be, completely failsafe. It is to be understood, however, that in an alternate embodiment, a conventional reset switch could be provided which would be required to reset the relay 20 and the power shut-off switches 18 and 19 if that combination were desired. To this end, the plug 7 would ordinarily not have to be unplugged and replugged again if such a reset was used.

In review of the above operation, no matter where the setting position of the heat regulating switch 17 is, water may "bridge" the space 22 between metallic foil conductors which form the water sensing strip 12 of FIGS. 1a–4b. In this arrangement, the "bridging" of the metallic foils by water causes electric current to go through condensor 35, condensor 57 and condensor 63. This is because the condensor 63 "sees" the end of condensor 57 at point 65 such that a voltage is produced which exceeds the breakover voltage of the trigger diode 59. As a result, this turns on trigger diode 59, as well as triac 43 by triggering its gate 45 with discharging electricity from the condensor 63. This causes relay 20 to actuate the power shut-off switches 18 and 19 by opening the armatures thereof, to shut off their contact points respectively. This then prevents the electric current from power plug 7 from going into the heater circuit 13.

In this connection, if the water sensing strip 14, without exception, comes into contact with water or any other conducting fluid which "bridges" the space between the conductors of the water sensing strip so as to make a connection across the conductors thereof, the possibility of electric shock to the user is prevented by instantly interrupting the electric current as the water sensing strip 14 comes in contact with water. This is true whether or not the water sensing strip is in the appliance, as shown in FIGS. 1c, 2 and 3, or whether the water sensing strip is in the dryer holder 5. Accordingly, a fatal shock and even death are prevented if the dryer or holder falls or is pulled into a tub of water in which someone is bathing or if someone reaches or steps into water containing the plugged-in dryer, regardless of whether the on/off switch 17 is in its in or off position.

This invention has the advantage of providing a water-safe electric appliance. More particularly, this invention provides a water-safe hair dryer and a power shut-off circuit therefor. In the combination of the water-safe appliance and the power shut-off circuit, the latter eliminates the possibility of electric shock and the electrocution to the user by instantly interrupting the electric current to the appliance if the appliance comes into contact with water. This has the advantage that the power shut-off circuit in combination with the hair dryer and/or its holder can be neatly stored in any bathroom, which is a serious hazard in view of the fact that the great majority of hair dryers today are used in bathrooms. Moreover, the power shut-off circuit of this invention employs inexpensive and off-the-shelf items to provide a central inexpensive and adaptable power shut-off circuit, which may be embodied in a small or circuit. This has the advantage that the power shut-off circuit can be put into the dryer or its holder or into a separate breaker therefor. Also, it can be used with a wide variety of appliances, including dryers, razors, hair curlers, power tools, aquarium pumps, etc. Still further, this invention has the advantage of providing a novel water sensing means.

What is claimed:

1. A power shut-off circuit for water sensing means having opposing, spaced-apart conductors adapted to produce a voltage when water bridges the space between the conductors comprising:

(a) a power shut-off means having first and second normally closed switches connected in a circuit to a power source means having a first leg and a second leg formed with a condensor for producing a voltage connection across the space between the conductors when water bridges said space; and (b) means responsive to the voltage connection across the space between the conductors of the water sensing means for opening the normally closed switches for shutting off the circuit to the power source means, the means responsive to the voltage connection across the space between the conductors of the water sensing means having a normally open triac switch having a gate responsive to said voltage connection and first and second leads including a relay connected respectively to opposite legs of the power source means, said gate being connected for transmitting the voltage connection in an initial path to the triac switch to open the triac switch for transmitting in a second path across said triac through said relay to the power source means to cause said first and second switches to open, thereby to shut-off the circuit connection of the first and second switches to the power source means, and second and third condensors connected in series between said voltage connection and the second lead of the power source means, one side of both the second and third condensors being connected to one side of the triac gate for responding to the voltage connection for transmitting a voltage to the normally-open triac switch that exceeds the breakover voltage thereof to close the triac switch in response to the bridging of the space between the opposing conductors of the water sensing means by water in accordance with the charging of the condensors from the power source means even when there is only a momentary voltage connection across the space between the conductors of the water sensing means.

2. The circuit of claim 1 having a trigger diode in series with the triac gate.

3. The circuit of claim 2 including an electrical appliance adapted to be connected in the circuit formed by the normally closed switches for running the appliance on a current between said normally closed switches from the power source means when there is no voltage connection across the space between the opposing conductors of the water sensing means, said switches also opening to shut-off the running of the appliance when even a momentary voltage connection is made across the space between the conductors of the water sensing means by the presence of water therein for the protection against the risk of electrocution when the appliance is immersed in water.

* * * * *